May 31, 1966 R. E. BUSCH 3,253,757

TAPE FEEDING MECHANISM

Filed Dec. 23, 1963 4 Sheets-Sheet 1

INVENTOR.
RICHARD E. BUSCH

BY [signature]
ATTORNEY.

May 31, 1966 R. E. BUSCH 3,253,757

TAPE FEEDING MECHANISM

Filed Dec. 23, 1963 4 Sheets-Sheet 2

INVENTOR.
RICHARD E. BUSCH

BY

ATTORNEY.

INVENTOR.
RICHARD E. BUSCH
BY
[signature]
ATTORNEY.

May 31, 1966 R. E. BUSCH 3,253,757

TAPE FEEDING MECHANISM

Filed Dec. 23, 1963 4 Sheets-Sheet 4

INVENTOR
RICHARD E. BUSCH

BY

ATTORNEY.

United States Patent Office 3,253,757

Patented May 31, 1966

3,253,757

TAPE FEEDING MECHANISM

Richard E. Busch, La Puente, Calif., assignor to Clary Corporation, San Gabriel, Calif., a corporation of California Filed Dec. 23, 1963, Ser. No. 332,716

3 Claims. (Cl. 226—67)

This invention relates to punched tape handling equipment, such as is used to record or sense data in coded form on a tape, and has particular reference to apparatus for intermittently feeding a tape through a tape punch or tape reading device.

Heretofore, tape feeding devices of the above type have generally comprised pawl and ratchet mechanisms in which a ratchet is intermittently advanced by a suitable pawl and the latter, in turn, drives a toothed sprocket by which the tape is fed. Such pawl and ratchet mechanisms, when driven at speeds on the order of 200 steps per second or more, become subject to overthrow and misfeeding due generally to the mass of the intermittently advanced parts such as the driven ratchet, tape advancing sprocket, etc. Such devices also tend to wear and become noisy, due to the high velocity at which the feed pawl moves over and engages successive teeth of the ratchet.

Although the diameter of the toothed sprocket etc. could be reduced to likewise reduce the mass subject to acceleration and deceleration forces, the number of sprocket teeth would have to correspondingly be reduced. Accordingly, the number of teeth in engagement with tape perforations would also be reduced thereby increasing the likelihood of the teeth tearing the edges of the tape surrounding the tape perforations.

Also, at relatively high speeds, problems are encountered in feeding the tape from a supply roll to the punch or tape sensing device, and from the latter to the take-up roll due in part to the intermittent motion transmitted to the tape and the fact that such rolls cannot be intermittently driven at the same speed as the tape because of the relatively large masses involved. That is, when the intermittent movement of the tape by the feeding device is transmitted to the relatively heavy supply and take-up rolls through the tape, the resulting strain on such tape often causes the drive teeth of the sprocket or other feeding device to tear the portions of the tape surrounding the tape perforations and such strain may even tear the paper itself. Solutions to this problem heretofore have generally led to the provision of loops between the supply roll and the punch or sensing head on one hand and between the take-up roll and the head on the other hand, with relatively sophisticated and expensive servo mechanisms to maintain the loops.

Accordingly, a principal object of the present invention is to provide an intermittent tape advancing mechanism capable of reliable operation at high speeds.

Another object is to eliminate intermittently advanced parts in an intermittent tape advancing mechanism.

Another object is to reduce any tendency of the tape drive teeth of a tape advancing mechanism to tear the area surrounding the feed perforations in the tape.

Another object is to increase the number of drive teeth capable of engaging and driving a tape at any one time.

Another object is to provide a demand type tape feed mechanism capable of smoothly feeding tape from a supply source to a tape punch or the like.

Another object is to provide a relatively simple and economically manufactured high speed tape advancing mechanism.

The manner in which the above and other objects of the invention are accomplished will be readily understood on reference to the following specification when read in conjunction with the accompanying drawings, wherein.

Figure 1:
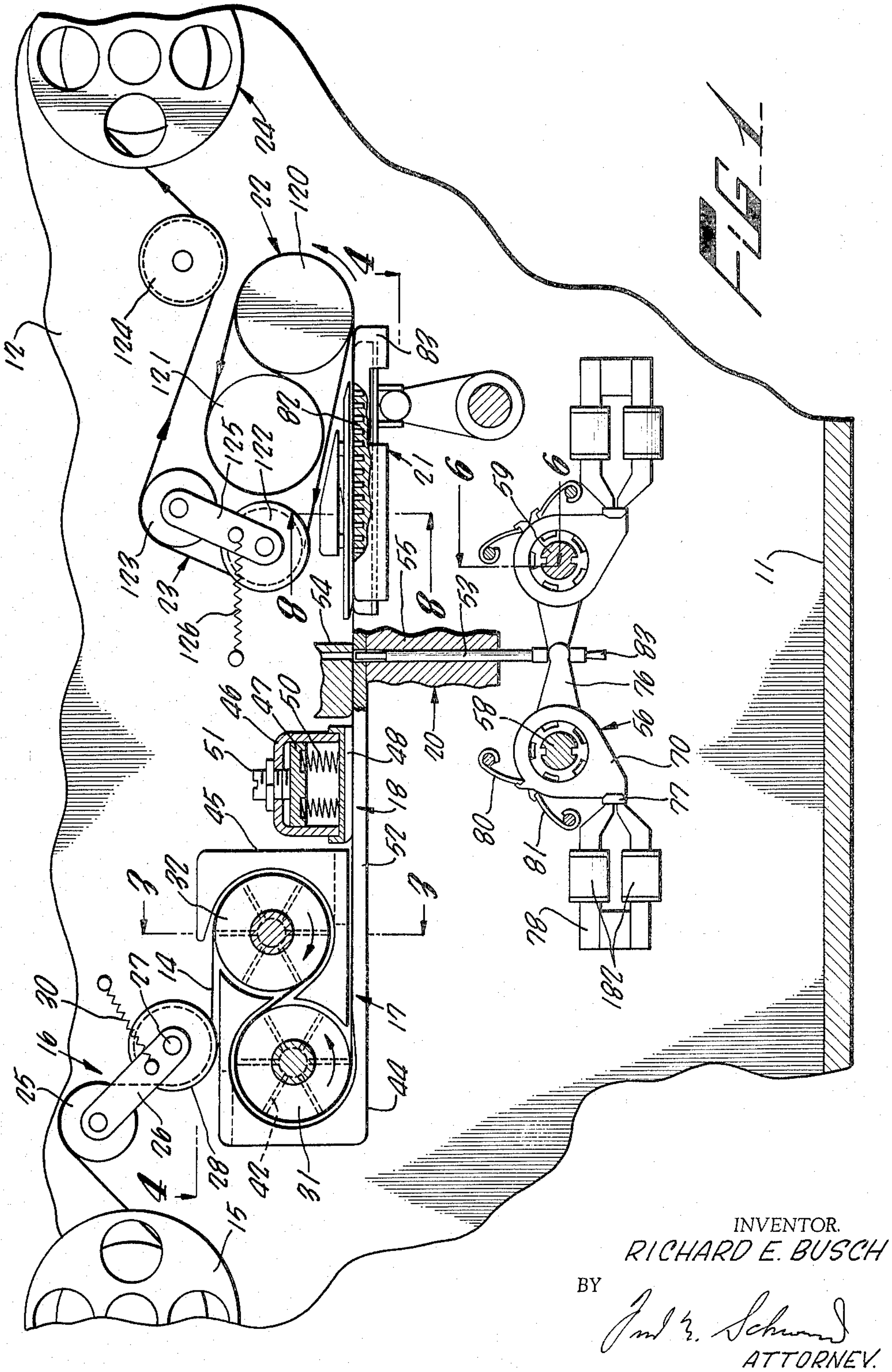
FIG. 1 is a longitudinal sectional view through a tape punch apparatus embodying a preferred form of the present invention, such view being taken substantially along the line 1—1 of FIG. 4.

The tape punch apparatus comprises a base 11 which supports a pair of spaced side frames 12 and 13. A paper tape 14 to be punched is guided from a supply roll 15, over a snubber unit 16, around a capstan drive unit 17, past a pressure pad device 18, through a tape punch unit, 20, over a tape advancing mechanism 21, through a take-up control device 22, over a snubber unit 23 and onto a yieldably driven take-up roll 24.

The snubber unit comprises a roller 25 supporting a portion of the tape and carried by an arm 26 pivotally supported on a shaft 27 on which a tape guide roller 28 is also freely mounted. A tension spring 30 urges the arm 26 clockwise to absorb any incremental advancing movement of the tape.

Figure 4:
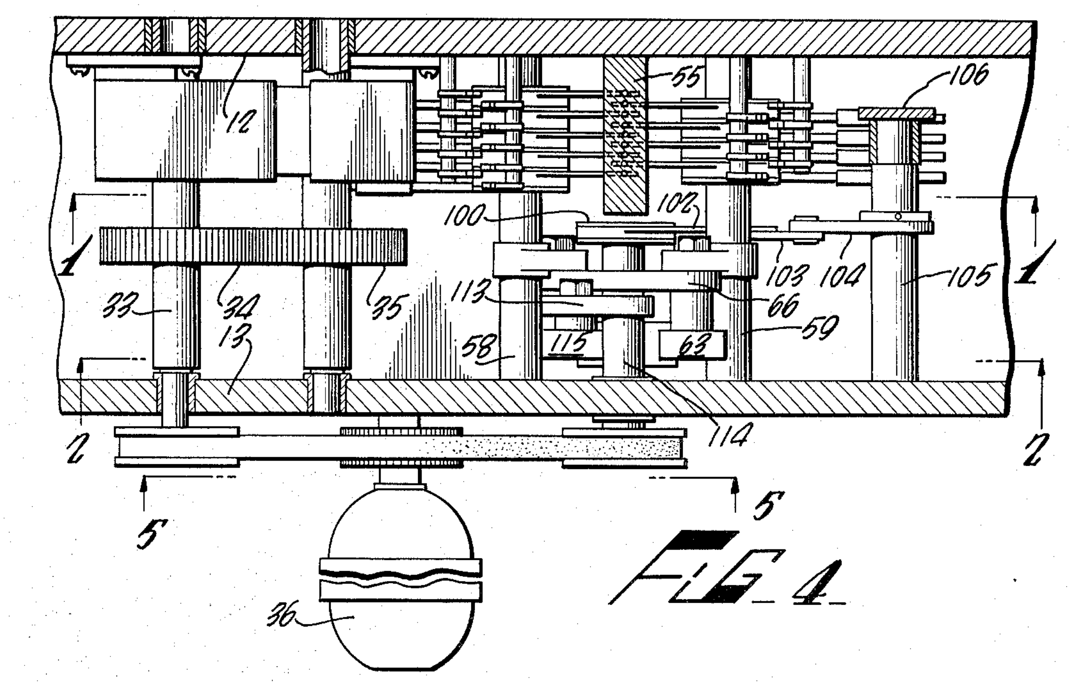
FIG. 4 is a sectional plan view taken substantially along the line 4—4 of FIG. 1.
Figure 5:
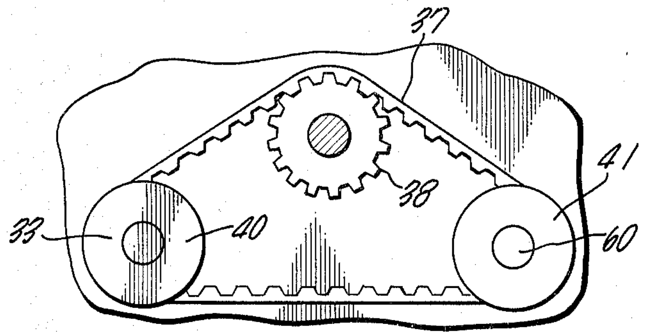
FIG. 5 is a sectional view of part of the drive mechanism and is taken along the line 5—5 of FIG. 4.

The capstan drive unit 17 comprises a pair of capstan rollers 31 and 32 having smooth peripheries, around which the tape is wrapped. The rollers are supported by shafts 33 rotatably mounted in bearings formed in the side frames 12 and 13 and geared together by gears 34 and 35. The rollers are continuously driven in the direction of the arrows *a* and *b* in FIG. 1 by a motor 36 through a cog belt 37 (see also FIGS. 4 and 5). The belt is wrapped over a drive sprocket 38 on the motor shaft and over a pair of sprockets 40 and 41, the former being attached to the shaft 33 of roller 31.

Figure 3:
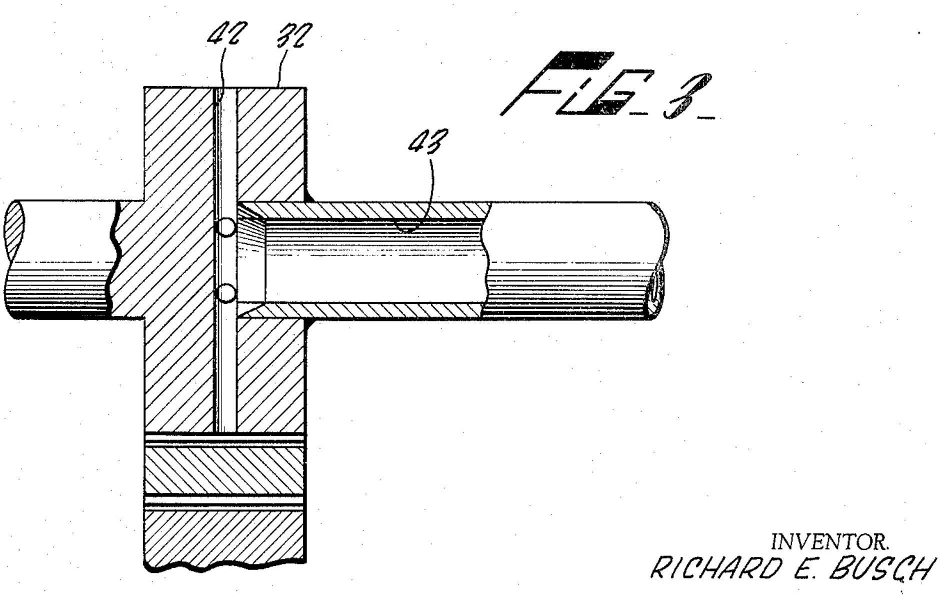
FIG. 3 is a sectional plan view of one of the capstan type tape drive rollers and is taken along line 3—3 of FIG. 1.

Each of the capstan rollers 31 and 32 has a series of radially extending passages 42 (see also FIG. 3) formed therein and communicating with an axial hole 43 which extends through the respective shaft to one end thereof.

A pair of shroud elements 44 and 45 closely surround the peripheries of the rollers 31 and 32 and are suitably supported by the side frame 12.

When the tape is at rest, the rotation of the rollers causes air to be directed outwardly by centrifugal force through the passages 42 to likewise force the tape 14 outwardly a slight amount from the surfaces of the rollers to prevent wearing of the tape at this point. However, when the tape is advanced by the advancing mechanism 21, the tape is drawn against the surface of the rollers 31 and 32, causing the latter to effect a capstan drive of the portion of the tape leading from the supply roll 15.

The pressure pad device 18 comprises an inverted U-shaped frame element 46 suitably supported by the side frame 12 and arranged to vertically guide a slider 47 and a pressure pad 48. Compression springs 50 are interposed between the slider and pad 48, and a screw 51 is threaded in the frame 46 to adjust the downward pressure of the pad 48 against the tape 14 which, at this point, is guided over a table 52 extending from the shroud member 44.

The punch unit 20 comprises a plurality of punches 53 located in a line extending transversely to the length of the tape and guided toward and away from a die plate 54 by bearings formed in a guide block 55.

Punch actuating units 56 are provided to selectively actuate the punches to punch coded information in the tape. Such actuator units are similar to those described and claimed in the copending application of R. E. Busch, Serial No. 286,612, filed on June 10, 1963, now Patent No. 3,198,428. Therefore, the construction and operation of the actuating units will be only briefly described herein.

Figure 2:
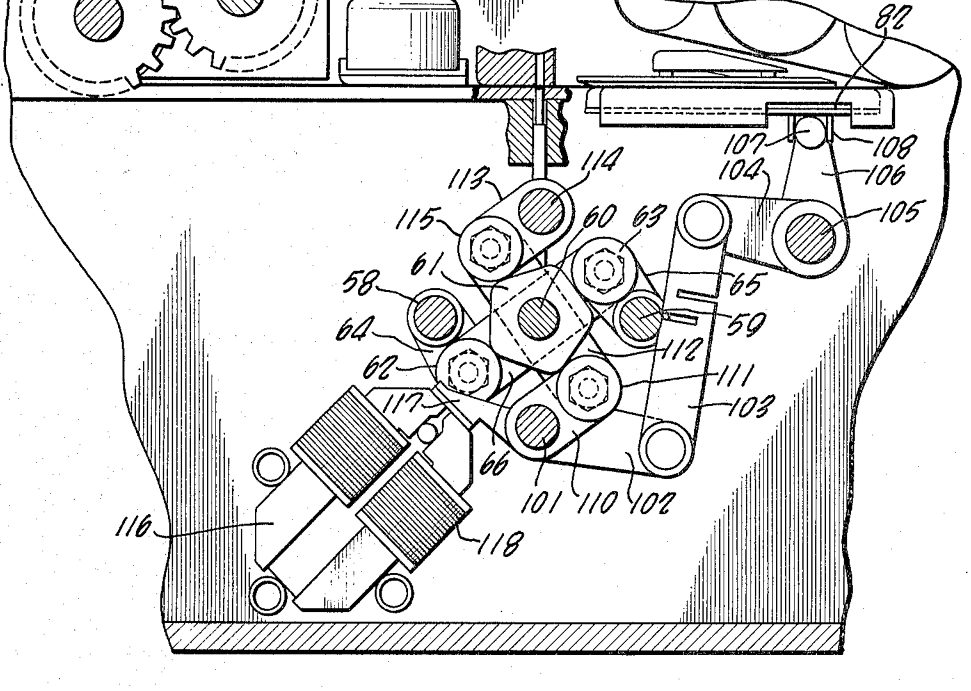
FIG. 2 is a longitudinal sectional view, with parts broken away, taken along line 2—2 of FIG. 4.

The actuator units 56 are mounted on respective shafts 58 and 59 journalled in bearings carried by the side frames 12 and 13. The shafts are continuously oscillated and for this purpose the driven cog belt 41 (FIG. 5) is mounted on a shaft 60 (see also FIG. 2), carrying a pentagon-shaped cam 61. The latter engages a pair of rollers 62 and 63 mounted on arms 64 and 65, respectively, attached to respective ones of the shafts 58 and 59. A link 66 is pivotally connected between the arms to insure positive oscillation of both shafts.

Figure 7:
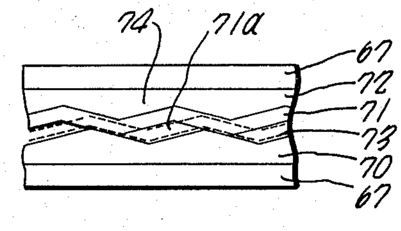
FIG. 7 is a developed view, partly broken away, illustrating the oscillating punch drive unit.
Figure 6:
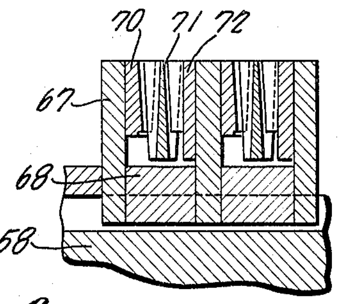
FIG. 6 is an enlarged fragmentary sectional view through one of the punch drive units and is taken along line 6—6 of FIG. 1.

Each of the actuator units comprises a retaining disc 67 (FIGS. 6 and 7) keyed to the respective shaft, i.e. 58. The discs of the various actuator units are spaced by sleeves 68, also keyed to the shaft. Mounted on each sleeve 68 intermediate adjacent discs 67 are a wedging disc 70 which is free on the sleeve, a driving disc 71, which is keyed on the sleeve for axial movement and a driven disc 72, which is loosely keyed on the shaft.

The face of the wedging disc 70, which faces the driving disc 71 has a set of V-shaped teeth 73 which engage matching teeth on the disc 71. Likewise, the face of disc 71 which faces the driven disc 72 has a set of teeth 74 which engage a similar set of teeth on the driven disc 72.

The driven disc 72 has an arm 76 thereon (FIG. 1) which extends into a notch formed in the associated punch 53 to reciprocate the latter.

The wedging disc 70 carries a soft iron armature 77 which cooperates with the pole pieces of a permanent magnet 78 to normally hold the disc from rotating counterclockwise under the urge of a compression type leaf spring 80.

As the shaft, i.e. 58, continually oscillates, the various discs 67 and 71 will also oscillate, but the wedging disc 70 will be held by the associated magnet 78. Thus, in the absence of any wedging action between the discs 70, 71 and 72, the latter disc will be held in its position shown in FIG. 1 by a compression type leaf spring 81. The latter is effective to normally hold the associated punch against a limit bar 83, thus maintaining the punch below the plane of the tape. Accordingly, as the shaft 58 oscillates, the driving disc 71 will merely slide axially between its solid line position 71 of FIG. 7 and its dot-dash line position 71*a*.

In order to effect operation of the associated punch 53, a pair of electromagnet coils 82 surrounding the legs of magnet 78 are energized to neutralize the magnetic flux pattern, thus releasing the wedging disc 70 to the influence of its spring 80. The latter disc will thus wedge the driving disc 70 against the driven disc 72 to thereby drive the same, including the punch, sufficiently to effect punching of the tape.

During return of the punch, the coils 82 are de-energized, permitting the magnet 78 to again hold the armature 77 and enabling the spring 81 to retain the punch in its lower position.

Figure 9:
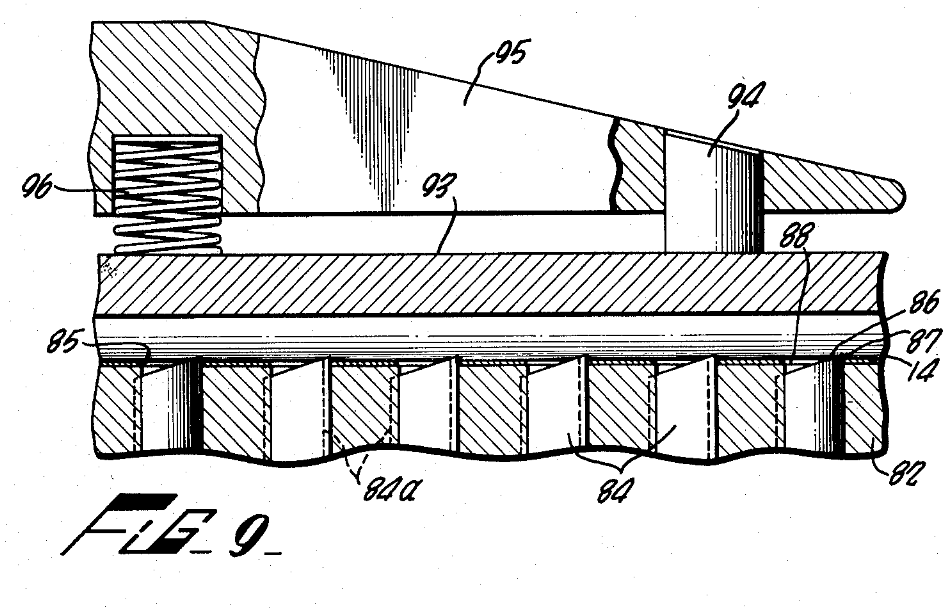
FIG. 9 is a sectional view taken along line 9—9 of FIG. 8.

The tape advancing mechanism 21 comprises an elongate slide 82 (FIGS. 1, 8, and 9) guided for longitudinal movement in a bearing block 83 which is suitably supported from the frame 12. The slide has a relatively large number of upstanding teeth 84 in the form of round pins which are fixed to the slide. The teeth are spaced apart distances equal to the distances between regularly spaced feed perforations 85, formed along the center of the tape 14. The teeth are formed with inclined upper surfaces 86 extending downwardly from a leading tip 87, located above the upper surface of the slide 82, to a trailing tip 88, located slightly below such upper surface.

Figure 8:
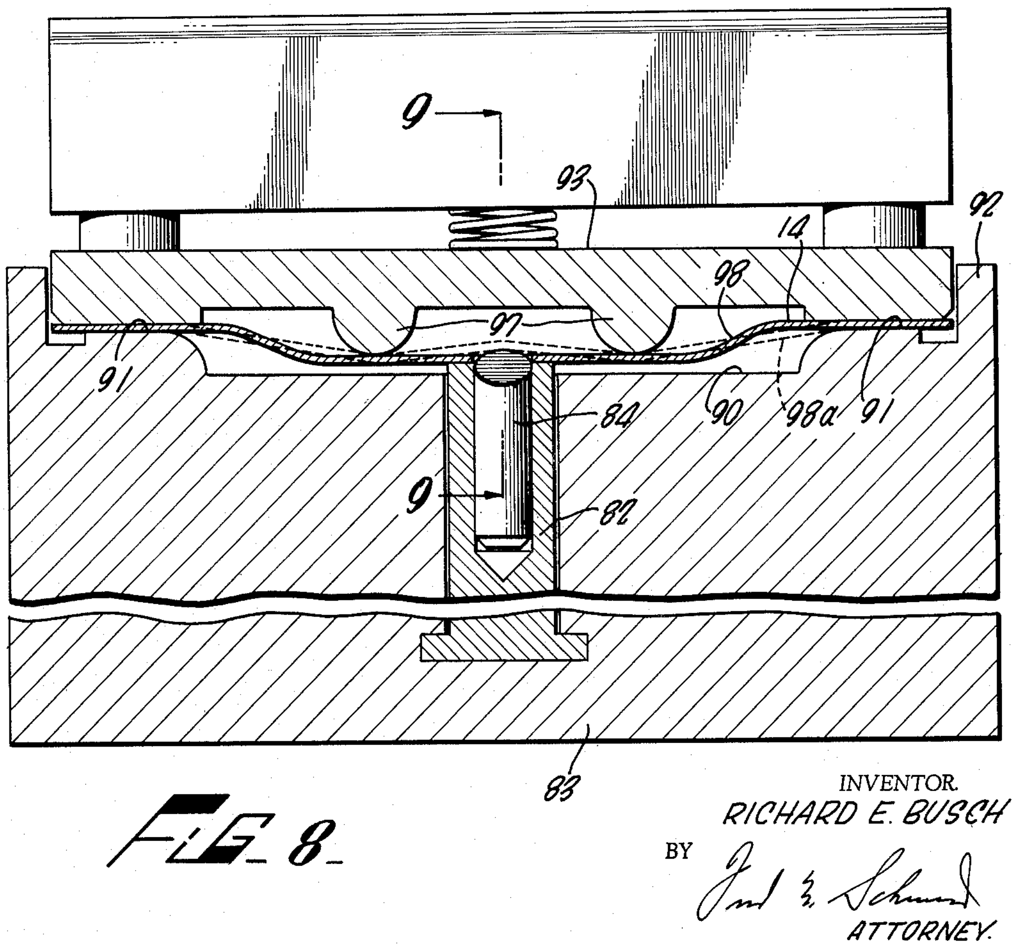
FIG. 8 is an enlarged transverse sectional view of the tape feed mechanism and is taken along the line 8—8 of FIG. 1.

As shown in FIG. 8, the upper surface of the slide 82 is located slightly above the bottom of a longitudinally extending groove 90, formed in the bearing block 83. Elevated tape guiding trackways 91 are located on opposite sides of the groove 90 and are located above the level of the teeth 84. Guide ledges 92 extend along the sides of the guideways 91 to laterally guide the tape.

A pressure pad 93 is located over the guide block 83 and is provided with guide pins 94 slideable vertically in bearings formed in a bracket 95, suitably supported from the side frame 12. Compression springs 96 are interposed between the bracket 95 and pressure pad 93 to urge the pressure pad downwardly so as to frictionally engage the tape along the runways 91.

It will be noted that the pressure pad has two longitudinally extending ridges 97 on opposite sides of the row of teeth 84. Such ridges extend below the level of the guideways 91 and substantially into the plane of the upper surface of the slide 82. Now, due to the inherent stiffness of the tape in a lateral direction, the ridges 97 normally maintain the central portion of the tape directly on the surface of the slide, as seen in the full lines of FIG. 8. In this case, the outer portions 98 of the tape assume substantially S-shaped curve formations, shown in full lines. When the slide is moved to the right in FIG. 9, the leading edges of the teeth 84 will accordingly drive the tape to the right and since a large number of teeth are concurrently in engagement with the tape perforations, no tearing of such perforations will occur even though acceleration forces may be abnormally high.

However, during return movement of the slide, the upper surfaces 86 of the teeth 84 will cam the central portion of the tape upwardly into its dot-dash line position shown in FIG. 8. This will draw the tape laterally over the ridges 97 and toward its center a slight amount, causing the outer portions 98 to assume their dot-dash line positions 98*a*. As the teeth reach the end of their return movements, the tape, due to its resilient nature and flexed condition under the influence of the ridges 97, will again snap into its full line position of FIGS. 8 and 9.

Means are provided to reciprocate the slide 82 to advance the tape one increment as an incident to each punching operation. For this purpose, an actuator unit 100 (FIG. 4) is employed, similar in construction to the actuator units 56 described heretofore. The actuator unit 100 is mounted on an oscillating shaft 101 (FIG. 2) and its driven element extends in the form of an arm 102 which is connected by a link 103 to an arm 104 attached to a rock shaft 105. The latter carries an arm 106, having a pin 107 fitted between guide walls 108, depending from the slide 82 whereby to reciprocate the slide.

The shaft 101 is continuously oscillated by the cam 61 and for this purpase it carries an arm 110 which rotatably supports a roller 111 engaged by the cam 61. A link 112 connects the arm 110 to a second arm 113 which is pivotally supported at 114 and carries a second roller 115 engageable with the cam 61 on the side opposite the roller 111.

The actuator unit 100 is controlled by a magnet device similar to the magnet device 78 of FIG. 1, and comprises a permanent magnet 116 which normally holds the armature 117 of a control member, not shown, in the actuating unit 100 in ineffective condition. When control coils 118 on the magnet 116 are energized, the armature 117 is released, enabling the actuator unit to be driven by the shaft 101 to reciprocate the slide 82 through one cycle so as to advance the tape one increment.

Timing of the operation of the tape advancing mechanism relative to the operation of the punching mechanism is determined by the angular position of the rollers 111, 115 about the cam 61 relative to the rollers 62, 63.

The length of the stroke of slide 82 is preferably slightly greater than the distance between adjacent tape perforations and advancing teeth 84. Thus, when the slide is returned from its advanced position, the teeth 84 will move slightly past the newly aligned tape perforations, as indicated by the dot-dash lines **84*a*. This will permit sufficient clearance between each tooth and its aligned tape perforation to insure that the tape can snap into position directly in front of the teeth before the next tape advance movement can occur. This is permitted by the inclined upper surfaces 86 of the teeth and is made possible in view of the small mass of the portion of the tape in the neighborhood of the punch and the provision of the frictional forces created by the pressure pads 48 and 93** which prevent such portion of the tape from overthrowing at the end of the advancing movement imparted thereto.

The take-up roll 24 is yieldably driven in a continuous manner by the drive motor 36, in a manner not shown, to accumulate the tape as it is fed from the punch unit. However, in order to prevent the pull on the tape applied by the take-up roll from drawing the tape through the punch unit independently of the tape advancing mechanism 21, the tape, as it leaves the mechanism 21, passes counterclockwise around a first stationary cylindrical guide 120 and thence counterclockwise around a second stationary guide 121, from which it passes clockwise around the guide 120 under the preceding or outer layer of tape. The tape then passes around a free roller 122, over a snubber roller 123, under guide roller 124, and onto the take-up roll 24. The roller 123 is carried by arm 125, pivotal about the axis of roller 122 and urged counterclockwise by tension spring 126.

When the tape advancing mechanism is at rest, the pull of the take-up roll causes the tape to be drawn taut against the surfaces of the cylindrical guides 120 and 121 and the frictional forces developed between the tape and such guides, as well as between the two layers of tape surrounding the guide 120, prevent the tape from being drawn through the punch. However, as a portion of the tape is fed out of the punch by the advancing mechanism 21, it will release the tension of that portion thereof which is wrapped about the guides a slight amount, permitting an amount equal to the pitch of the teeth 84 to be drawn onto the take-up roll.

The snubber roll 23 prevents any abrupt movements of the tape from being transferred to the take-up roll.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. Mechanism for feeding a tape or the like having perforations spaced therealong, comprising a slide, means for reciprocating said slide through advance and retrograde movements, said slide having a tape engaging surface extending in a plane parallel to the direction of reciprocation of said slide, a feed tooth on said slide, the leading edge of said tooth extending outwardly from said surface sufficiently to engage one of said perforations whereby to advance said tape upon said advance movement of said slide, the upper surface of said tooth receding to a trailing edge which is of insufficient height to engage a said perforation during said retrograde movement of said slide, a guide for said tape, said guide comprising guideways on opposite sides of said slide, a pressure pad, spring means causing said pad to urge said tape against said guideways, a pair of spaced ridges on said pad forming a groove extending over said tooth, said ridges normally stretching said tape therebetween and causing said tape to assume a curved condition intermediate said ridges and respective ones of said guideways, the upper surface of said tooth being effective to cam the portion of said tape thereadjacent into said groove during said retrograde movement.

2. Mechanism for intermittently feeding an elongate tape or the like having perforations spaced therealong comprising, a guide for said tape, said guide including a pair of spaced guideways, a pressure pad, spring means causing said pad to urge said tape against said guideways, a feed tooth, means for reciprocating said tooth lengthwise of the path of said tape and between said guideways, the leading edge of said tooth extending into said path sufficiently to engage a said perforations whereby to advance said tape during advance movement of said tooth, the trailing edge of tooth extending out of said path whereby said tooth is ineffective to cause retrograde movement of said tape during retrograde movement of said tooth, a pair of spaced ridges on said pad forming a groove extending over said tooth, said ridges normally stretching said tape thereover and causing said tape to assume a curved condition intermediate said ridges and respective ones of said guideways, the upper surface of said tooth being effective to draw a portion of said tape over said ridges from between said ridges and said respective guideways and to cam the portion of said tape extending between said ridges into said groove during retrograde movement of said tooth.

3. Mechanism for feeding a tape or the like having perforations spaced therealong comprising a slide, means for reciprocating said slide through advance and retrograde movements, a feed tooth on said slide, the leading edge of said tooth extending to a height sufficient to engage one of said perforations whereby to advance said tape upon advance movement of said slide, the upper surface of said tooth receding to a trailing edge which is of insufficient height to engage a said perforation during said retrograde movement of said slide, a guide for said tape comprising a guideway on at least one side of said slide and extending along the length of said slide, means on the opposite side of said slide resisting transverse movement of said tape, a pressure pad, spring means causing said pad to urge said tape against said guideway, a pair of spaced ridges on said pad forming a groove extending over said tooth, said ridges normally stretching said tape therebetween and causing said tape to assume a curved condition intermediate said guideway and the adjacent one of said ridges, and the upper surface of said tooth being effective to cam the portion of said tape thereadjacent into said groove during said retrograde movement.

References Cited by the Examiner

UNITED STATES PATENTS

| | | | |
|---|---|---|---|
| 1,444,884 | 2/1923 | Pittman | 226—67 X |
| 1,767,846 | 6/1930 | Howell | 226—67 X |
| 2,817,515 | 12/1957 | Przysiecki | 226—67 |
| 3,051,361 | 8/1962 | Menkel | 226—59 X |

ROBERT B. REEVES, *Primary Examiner.*

M. HENSON WOOD, Jr., *Examiner.*

W. F. McCARTHY, J. ERLICH, *Assistant Examiners.*